Dec. 23, 1947. E. CZAPEK Re. 22,950
CELLULOSE SHEETS AND PROCESSES FOR MAKING THEM
Original Filed Aug. 12, 1937 2 Sheets-Sheet 1
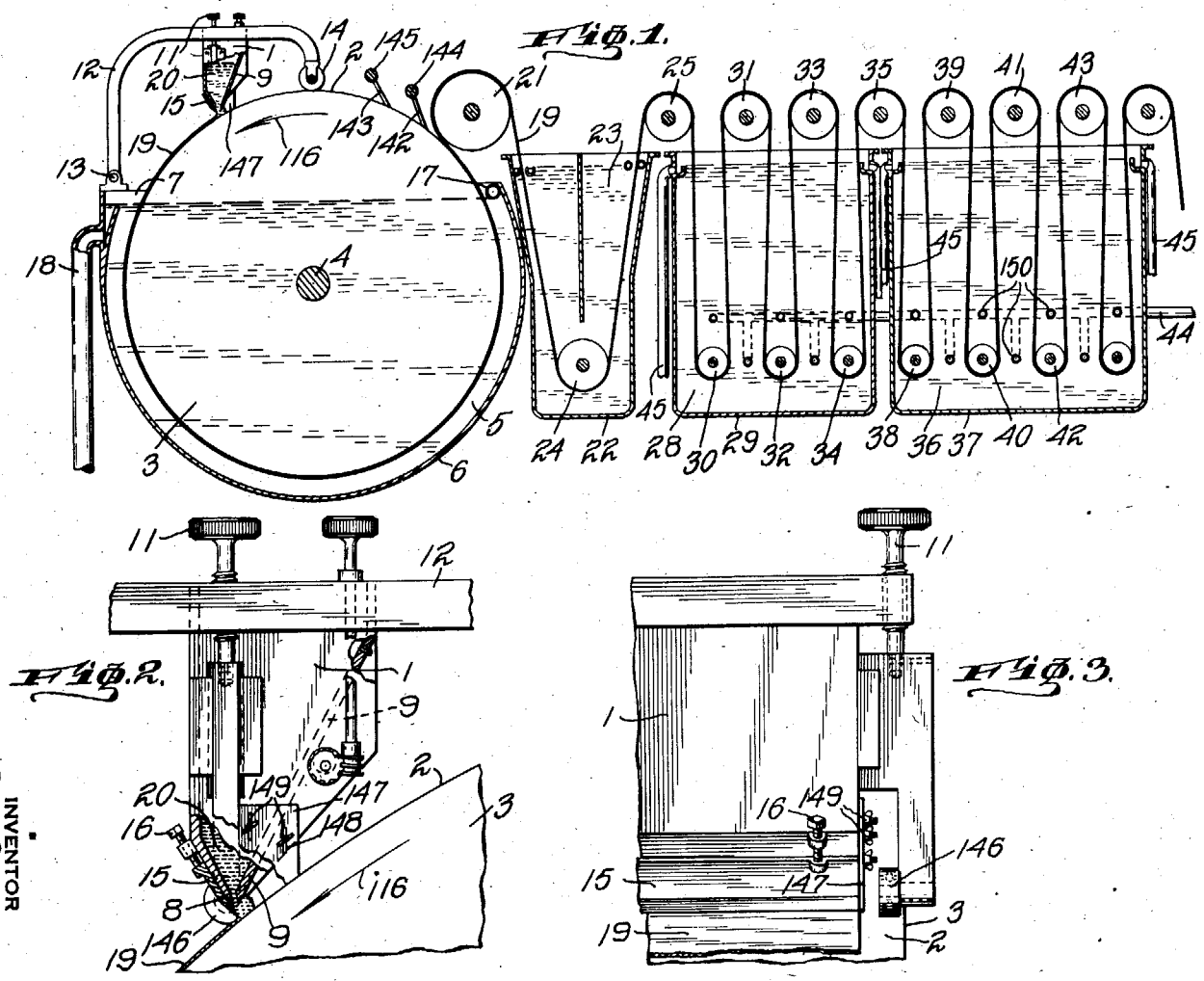
INVENTOR
EMIL CZAPEK
BY Gustav Drews
ATTORNEY Dec. 23, 1947. E. CZAPEK Re. 22,950
CELLULOSE SHEETS AND PROCESSES FOR MAKING THEM
Original Filed Aug. 12, 1937 2 Sheets-Sheet 2
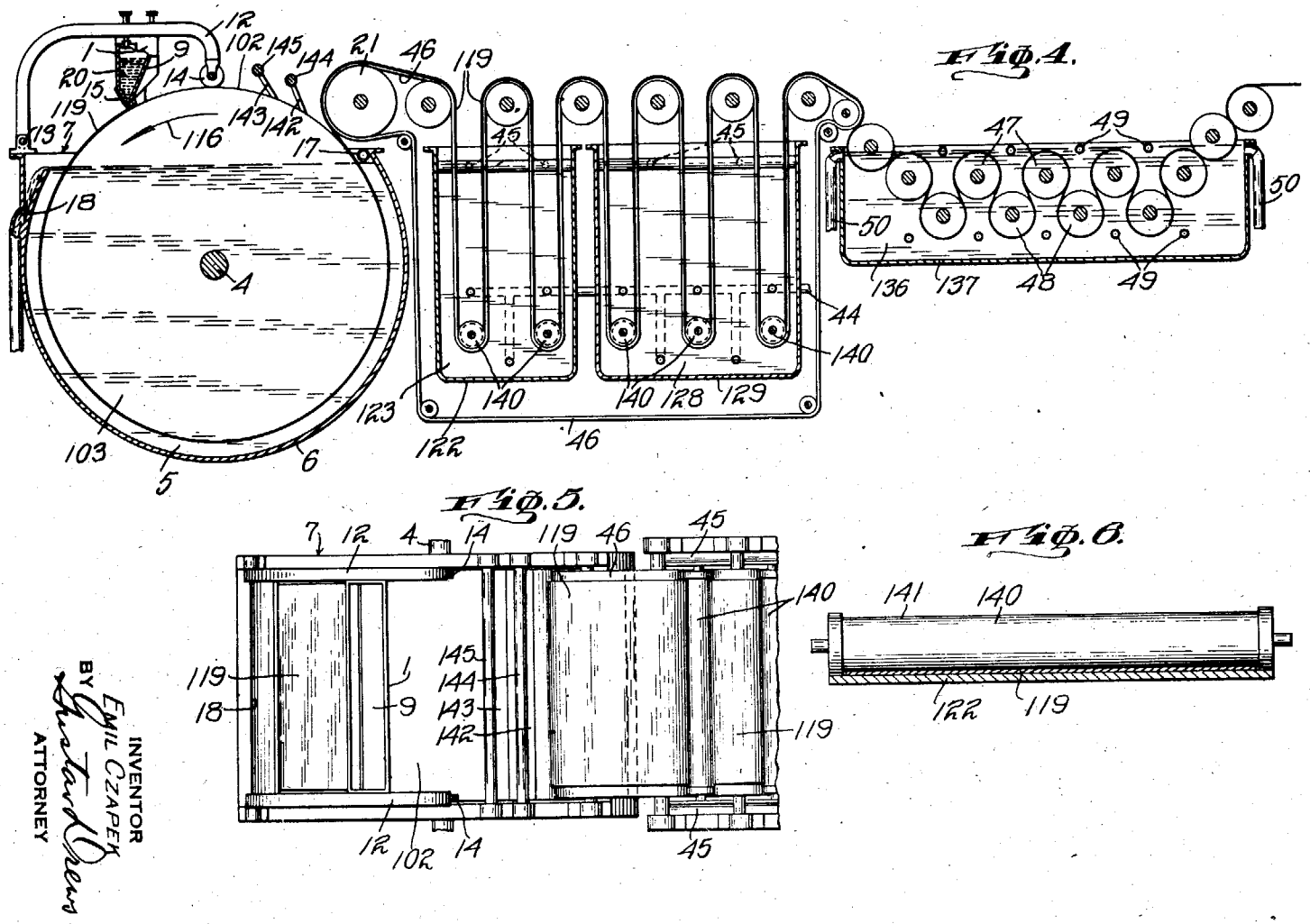
INVENTOR
EMIL CZAPEK
BY Gustav Drews
ATTORNEY Reissued Dec. 23, 1947

Re. 22,950

UNITED STATES PATENT OFFICE 22,950

CELLULOSE SHEETS AND PROCESSES FOR MAKING THEM

Emil Czapek, New York, N. Y.

Original No. 2,234,964, dated March 18, 1941, Serial No. 158,746, August 12, 1937. Application for reissue July 8, 1946, Serial No. 681,896

15 Claims. (Cl. 18—57)

This invention relates to the production of improved cellulose sheets, films or the like as new articles of manufacture, and the processes of making the same.

Among the objects of the present invention, it is aimed to provide an improved cellulose sheet, film or the like of an exceedingly uniform physical structure throughout having a practically equal tension and shrinkage characteristic in length as well as in width.

It is still another object of the present invention to provide an improved cellulose sheet, film or the like of an exceedingly slight thickness without striations and the like and having a width of forty inches or more by means of a continuously operating process.

It is still another object of the present invention to provide improved processes for producing the aforesaid improved cellulose sheets, films and the like.

These and other features, capabilities and advantages of the present invention will appear from the subjoined detail description of the article, processes and machines for carrying out the processes illustrated in the accompanying drawings in which Figure 1 is a side elevation more or less diagrammatically of one embodiment;

Figure 2 is a side elevation of the feeding device used in the embodiment of Fig. 1;

Figure 3 is a fragmental transverse section of the feeding device shown in Fig. 2;

Figure 4 is a side elevation more or less diagrammatically of another embodiment;

Figure 5 is a fragmental plan of the embodiment shown in Fig. 4; and

Figure 6 is a front elevation of one of the conveyor supporting idlers used in the embodiment of Fig. 4.

The present invention essentially uses a pouring base onto which a copper oxide ammonia cellulose solution is evenly poured by means of an exact fitting nozzle. Thereupon, the solution which adheres to the base and therefore cannot be subjected to stretching or extending, passes by moving or rotating at the base into a coagulation bath. In the coagulation bath which is in continuous movement, the poured sheet will be coagulated to a strip and only then removed when the coagulation has been completed and the solution of the coagulation bath has penetrated the sheet to the pouring base. The film after removal has practically the same length and width as the formerly spread solution and furthermore does not change these dimensions while passing through the bath.

To carry out the process in accordance with the invention, it is desirable to use, not only the apparatus but also the concentration and chemical proportions in the cellulose solution, and the treating baths now to be mentioned.

In the embodiment shown in Fig. 1, there is provided a nozzle 1 for feeding a solution of copper oxide ammonia cellulose onto a supporting base consisting in the present instance of the supporting face 2 of the drum 3, which, however, also may consist of an endless band.

The drum 3 is rotatably mounted on the shaft 4 extending through the trough 5, the arcuate wall 6 of which is spaced from the face 2 a uniform distance throughout, while the end faces of the drum 3 are preferably closed and in engagement with the plane end walls 7 of the trough 5. The drum 3 is preferably provided with a metal cylindrical wall member to provide the supporting face 2, the wall being composed as an instance of either iron, steel, nickel or the like or the wall provided with a coating of nickel, chromium or the like and then either highly polished to form a glossy or glistening surface or else dull finished or provided with a finish consisting of a graduation of one or the other according to the surface finish of the film, sheet or the like to be produced.

The main copper oxide ammonia cellulose containing solution is introduced by the nozzle 1 to the metallic surface 2 of the drum 3, the nozzle 1 having a long narrow discharge opening 8, the width of which is adjustable by the pivotally mounted wall member 9.

When enlarging or narrowing the discharge opening by shifting the wall part 9, accordingly more or less cellulose solution will flow through the opening 8 onto the pouring base 2. The nozzle 1 itself is supported in a bracket 12 which is pivotally connected to rotate about the pivots 13, and is provided with the rollers 14 resting on the drum 3. The nozzle 1 is adjustably mounted in the bracket 12 and rests on the pouring base 2 by means of the two rotating rollers 146. The position of the nozzle 1 is regulated through the screw 11. In order to prevent any vagrant discharges from the sides of the nozzle 1 for the several adjustments possible, there are provided the vertically adjustable end plates or baffles 147 having vertically extending slots 148 cooperating with the wing nuts 149.

Attached to the lower edge of the wall 10 of the nozzle 1 is a bar 15 which has been tapered into a knife-like edge and by a set of screws 16 the position thereof may be adjusted. The adjustment must be to the finest extent and very exact, as the thickness of the film is adjusted and regulated thereby.

The thickness of the finished film is determined by, i. e., proportionately to, the amount of cellulose solution 20 which the knife-like edge of the bar 15 leaves on the pouring base 2.

The width of the slot 8 will be adjusted through changing the wall 9 to insure sufficient cellulose solution in front of the edge 15 so that the cellulose solution will be sufficiently spread out on the pouring base 2 below the nozzle. The width of opening of the nozzle 1 depends upon the thickness of the film to be manufactured, on the velocity of the drum 3 and on the viscosity of the cellulose solution.

The drum 3 rotates in the direction of the arrow 116. The cellulose solution is spread directly onto the surface by rotating the drum 3 without passing through a free intermediate space, and thereupon passes into trough 5 and is here coagulated by the fluid contained therein.

The trough 5 will be supplied with a treating fluid introduced through the inlet 17, the treating fluid consisting essentially of sodium hydroxide, ammonia and copper, which is subsequently discharged through the outlet 18.

It will be noted that the inlet 17 and outlet 18 are disposed at the upper level of the fluid in the trough 5 and at the opposite ends thereof, the inlet 17 just below the position where the film 19 leaves the drum 3 and the outlet 18 a short distance below where the solution 20 is initially poured onto the outer face 2 of the drum 3.

The concentration and the velocity of the fluid flowing through trough 5 is determined by the components of the interacting solutions and fluids, hereinafter set forth in detail.

The film layer 19 will adhere to the surface 2 of the drum 3 by its uncoagulated surface during the entire coagulation process and does not permit that any part of the fluid in trough 5 penetrates between the face 2 and the adhering surface of the layer 19. This coagulation proceeds progressively through the film from the exposed surface to the underlying adhering surface. Only after the coagulation has been completed, will the coagulation fluid penetrate through the coagulated layer 19 and thereby arrive at the surface 2 of the drum 3 which it now wets. Furthermore, only after this has been accomplished will the sheet 19 be taken from the drum 3.

For a proper coagulation of layer 19, it is important that the coagulation fluid in trough 5 flows past the layer 19. In order to effect a good flow or movement of the fluid, trough 5 is so shaped that only a small space intervenes between the pouring face 2 and the opposite wall of the trough 5 in the entire extent through which the coagulation fluid flows. Velocities of two inches per second and above for the movement of the fluid are preferred.

The thus produced sheet or strip 19 may be removed from the surface 2 without difficulty. It is completley coagulated and still of the same length and width as at the beginning of the process. The strip 19 passes now for a short time through another trough containing a coagulation fluid in order to wet that surface of the sheet which had not been touched by the coagulation bath so long as it remained on the base 2.

After the layer 19 leaves the bath in the trough 5 and while still in adhesive engagement with the face 2 of the drum 3 until the face 2 entirely clears the upper level of the bath, the layer 19 then passes onto the outer surface of the roller 21 from which it passes into the container 22 so that the face of the layer heretofore in engagement with the face 2 of the drum 3 may now be effectively treated with a coagulation fluid similar to that contained in the trough 5.

In order to effectively dry the surface 2 and thereby remove any deposits, moisture and the like either from the strip 19 or from the trough 5 after the strip passes onto the roller 21 and in the area of the surface 2 disposed between the roller 21 and the nozzle 1, there are provided scraping means, such as the scrapers 142 and 143 consisting in the present instance of the blades pivotally mounted on the shafts 144 and 145 so that as here shown they rest by gravity on the surface 2 and in opposition to the direction of movement of such surface 2.

After leaving the roller 21 and in order to facilitate guiding the strip 19 through the bath 23 in the container 22, the strip next passes down under the roller 24 near the lower end of the container 22, then up above the roller 25 before being passed into the water 28 in the next container 29 where any of the bath fluid adhering to the outer faces of the strip 19 is now effectively washed off and some of the coagulation bath fluid which has generated the strip or been diffused into the same will be diluted and removed in part. For convenience, the strip 19 after leaving the roller 25 first passes around the roller 30 adjacent the lower end of the tank 29, then around the upper roller 31, again down around the lower roller 32, again up and around the upper roller 33, again down and around the roller 34 and then up out of the tank 29 around the roller 35 before being introduced into the acid bath 36 contained in the tank 37.

The strip 19 will be guided into and out of the acid bath 36 by means of the rollers 38 to 43 inclusive, in the manner well known in the art, where the strip 19 will be regenerated and the copper effectively removed.

After the strip 19 has been completely freed of the copper, it is now passed through several baths of clean, clear water and impregnated with softeners or plasticizers and dried. For drying the strip 19, the same is passed either through a well-known drying cylinder, not shown, or subjected to a stream of warm air supplied by a suitable blower or the strip subjected to a combination of both such drying treatments.

Preferably, in the embodiment just described, as shown in Fig. 1, the inlet 44 is connected to an extended tubular spray 150 having a plurality of branches extending adjacent to the path of movement of the strip 19 and provided with discharge openings directed at the face of the strip 19.

In the embodiment illustrated in Fig. 4, instead of permitting the strip here designated 119 to extend freely from one roller to the other, while passing through the secondary coagulation bath 123 in the tank 122 and while passing through the water 128 in the tank 129, it will be supported on the endless band 46 with the surface of the strip 119 exposed which formerly adhered to the face 102 of the drum 103. When so supported on the endless band 46, it will be noted that the rollers 140 in the lower portion of the tank 122 will be chambered at 141 so that the exposure of the face of the strip 119 here sought will not be interrupted.

Furthermore, in this embodiment, instead of permitting strip 119 to extend freely from one roller to the other while passing through the acid bath 136 in the tank 137, it will here pass directly from one roller to another, see the upper row of rollers 47 and the lower row of rollers 48 staggered relative to one another and overlapping one another effectively to support the strip 119 throughout its passage through the tank 137. Here, too, the acid bath is constantly being renewed and being fed to the several inlet pipes 49 with discharge openings directed at the faces of the strip 119, as they pass from one roller to the other. The tank 137 is also provided with an outlet 50 to permit the bath fluid to pass therefrom so that the copper, if in excess of five per cent, may be removed therefrom and fresh acid supplied to the predetermined concentration.

It is of course obvious that the baths 23 and 28 as well as the baths 123 and 128 may be renewed continuously as well as the other baths.

While it is desired not to be limited to the proportions, hereinafter set forth, it is claimed that the proportions here used in the process disclosed and machines used are new and particularly advantageous.

As an instance, excellent results have been achieved when the steps now to be described and proportions indicated are selected.

First, it is well to note that it is desirable to observe the chemical proportions hereinafter set forth so that the coagulation may take place correctly and tension-free into the inside of the solution 19 in order to facilitate faultlessly removing the finished strip 19 from the base 2 when the strip has already so solidified that it is self-sustaining and there will be no disadvantageous changes by the ensuing treatments in tanks 22, 29, 37 and the like.

The solution 20 introduced through the nozzle 1 consists essentially of an amount of cellulose corresponding to 5 to 8 per cent by weight of the entire solution, an amount of ammonia corresponding to 45 to 85 per cent by weight of the cellulose content, an amount of copper corresponding to 36 to 43 per cent by weight of the cellulose content, and an amount of sodium hydroxide which should not exceed 44 per cent concentration of the cellulose.

The fluid in the trough 5 constituting the coagulation bath, should consist essentially of a watery solution of sodium hydroxide in proportion of 5 to 9.5 per cent by weight of the bath, of ammonia in proportion of 0.1 to 0.5 per cent by weight of the bath, and of copper, dissolved in the fluid, of 0.1 to 1.2 per cent by weight of the bath.

The easiest manner of adding the agents supplementary to the sodium hydroxide is by starting the process with a coagulation bath of sodium hydroxide in the proportions heretofore recited and dissolving the other agents by the coagulation of a smaller amount of the cellulose. The coagulation bath absorbs the ammonia and the copper of the cellulose solution at once and the concentration of the proportions in this way will be quickly standardized which has to be observed during the process.

The transformation of the cellulose solution 20 into a solid, self-sustaining strip is done by dipping the pouring base 2 covered with the layer 19 by rotating or other movement of the base 2 into the coagulation bath in trough 5. The cellulose layer 19 is here coagulated from one side while the other uncoagulated side adheres closely and unmovably to the base 2 until the coagulation is completed.

The effect or rather the changes which take place in the layer 19 while passing through the trough 5 with the recited proportions of the ingredients both in the solution and in the fluid constitute the important steps in the process for obtaining uniform and tension-free strips. It has been found essential and advantageous that the ammonia which during the coagulation diffuses from the cellulose layer 19 into the coagulation fluid in the trough 5 is immediately washed out. Therefore, it is better that the coagulation fluid passes in a stream along the solution layer 19 throughout its entire extent and in an opposite direction to the movement of the pouring base 2. Only by maintaining the coagulation bath in motion in this way can the ammonia content be watched so that a detrimental accumulation on the boundary surface will be avoided.

The rate of flow of the fluid through the trough 5 will be determined by the respective components or ingredients of the solution introduced through the nozzle 1, the ingredients of the fluid in trough 5, the velocity of the movement of the base 2, the thickness of the layer 19, and, finally the extent and width of the fluid passage formed by the trough 5 and the base 2. Therefore, when the velocity of the flow is proper, it will be possible to maintain the total concentration of the ammonia in the coagulation fluid below 0.8 per cent by weight, and the risk of a detrimental accumulation of ammonia on the boundary surface or in pockets will be avoided. With the maximum quantity of ammonia in the coagulating solution, namely, 0.8 percent by weight, and the minimum amount of ammonia in the solution being coagulated, namely 2.25 percent by weight, the ammonia content of the former is approximately 35.55 percent of the ammonia content of the latter.

Since during the process by continuous coagulation additional quantities of ammonia will steadily enter into the coagulation bath from the cellulose layer, the ammonia has to be continuously removed from the coagulation bath so that the concentration of ammonia will not exceed 0.8 per cent by weight. This is accomplished as an instance when the fluid is removed from trough 5 through the discharge 18, the ammonia thereupon distilled off so that it will again be reduced to 0.1 to 0.5 per cent by weight of the fluid and this fluid then cooled off and returned to the trough 5 through the inlet 17.

The accumulation of copper in the fluid content of the trough 5 can ordinarily be ignored if care is exercised occasionally to remove the copper content when it exceeds 0.1 to 1.2 per cent by weight of the fluid.

The next step will be the washing of the strip 19 in order to rinse off the adhering part of the coagulation fluid as well as to dilute and partly remove the coagulation fluid seeped into the strip 19.

The rinsing or soaking of the strip 19 after it has been removed from the base 2, eventually, as set forth passes a second coagulation bath when it will be subjected to a bath of either water or a weak solution of sodium hydroxide. The rising may only be continued until the constituents of the strip 19 have been reduced to 20 parts by weight of copper, 3 parts by weight of ammonia and 22 parts by weight of sodium hydroxide, referring to a 100 parts by weight of cellulose. If the rinsing process should continue after this reduction has been reached, the strip 19 is in danger of becoming too delicate and deformed resulting in destructive internal tensions, irregularities, striations and the like.

The washed film thereupon is passed into an acid bath in which the cellulose will be entirely regenerated and the copper will be removed from the strip. It has been found advantageous to use a sulphuric acid bath of more than 2 and less than 5 per cent by weight at temperatures of more than 75 and less than 125 degrees Fahrenheit.

In this bath the shrinking of the strip takes place initially. Hereby a satisfactorily uniform treatment of the strip 19 without inducing any tensions, shrinkages or the like in the same can be obtained if the preliminary coagulation and washing has been done in a careful manner, and the concentration, temperature and the like have been followed closely, as mentioned.

Preferably also the bath 36 is being continually renewed, the bath fluid entering the tank 37 through the inlet 44 and leaving the tank 37 through the outlet 45 so that the bath fluid flows past the strip 19. In order to have the acid solution spread uniformly onto the strip, the inlet 44 is connected to an extended tubular spray 44 and branchways. The copper dissolved in the acid solution will be removed from the fluid which is discharged through outlet 45, and the fluid will again be replenished with fresh acid and reheated to the desired temperature. The copper content of the acid solution should not exceed 5 per cent by weight of the bath fluid.

After the strip 19 has been completely freed of copper, it is now passed through several baths of clean, clear water and impregnated with softeners and plasticizers and dried.

Strips made according to the present process and by the present machine are characterized by not having been stretched, extended or shrunk to any appreciable extent during the process of coagulation and washing resulting in a uniform physical structure throughout, free from striations, streaks and irregularities of any kind.

On account of the uniform treatment on the base in the first stage of the process when the transformation from the liquid into the solidified state takes place, the process is especially suited for the manufacture of thin strips and has been developed especially for this purpose.

In accordance with the present process, it is possible to manufacture sheet like strips not only having a weight of less than 0.35 ounce per thousand square inches, but also having a weight of less than 0.20 ounce and less than 0.10 ounce per thousand square inches, all characterized by being without striations, streaks and irregularities of any kind. Strips of the weight just indicated have a thickness of the order which is herein referred to as "thin."

It is obvious that various changes and modifications may be made to the details of construction without departing from the general spirit of the invention as set forth in the appended claims.

I claim:

1. A flexible and very strong cellulose hydrate strip capable of being crushed and crumpled and characterized by a uniform physical structure having a practically equal tension and shrinkage characteristic throughout, free from internal stresses, said strip being produced by directly supporting and then spreading on a dry supporting surface a copper oxide ammonia cellulose solution and effectively coagulating said spread solution by penetrating the so spread solution via the exposed surface thereof with a coagulating medium while said solution is in contact with said supporting surface until the coagulating medium finally penetrates to the supporting surface to form a thin layer, and finally regenerating and washing the thin layer so formed.

2. A flexible and very strong cellulose hydrate strip capable of being crushed and crumpled and characterized by a uniform physical structure having a practically equal tension and shrinkage characteristic throughout, free from internal stresses, and having a weight per thousand square inches of less than 0.35 ounce, said strip being produced by directly supporting and then spreading on a dry supporting surface a copper oxide ammonia cellulose solution and effectively coagulating said spread solution by penetrating the so spread solution via the exposed surface thereof with a coagulating medium while said solution is in contact with said supporting surface until the coagulating medium finally penetrates to the supporting surface to form a thin layer, and then regenerating the thin layer so formed by passing the same through an acid bath and finally washing the same.

3. A flexible and very strong cellulose hydrate strip capable of being crushed and crumpled and characterized by a uniform physical structure having a practically equal tension and shrinkage characteristic throughout, free from internal stresses, and having a weight per thousand square inches of less than 0.10 ounce, said strip being produced by directly supporting and then spreading on a dry supporting surface a copper oxide ammonia cellulose solution and effectively coagulating said spread solution by penetrating the so spread solution via the exposed surface thereof with a coagulating medium while said solution is in contact with said supporting surface until the coagulating medium finally penetrates to the supporting surface to form a thin layer, and then regenerating the thin layer so formed by passing the same through an acid bath and finally washing the same.

4. A continuous process of manufacturing cellulose hydrate strips comprising directly supplying to and supporting on a movable dry supporting surface a copper oxide ammonia cellulose solution, spreading the solution so supported and while being moved with the supporting surface into a thin layer, penetrating the solution with a coagulating medium effectively to coagulate the solution as a thin layer to convert the same in to substantially solid strip while said solution is in contact with said supporting surface until the coagulating medium finally penetrates to the supporting surface, removing the thus formed solid strip from the supporting surface, and removing the coagulating medium which has penetrated to the supporting surface from said supporting surface to prepare it for a fresh supply of copper oxide ammonia cellulose solution.

5. A continuous process of manufacturing cellulose hydrate strips comprising directly supplying to and supporting on a movable dry supporting surface a copper oxide ammonia cellulose solution in which the ammonia content is approximately 45 to 85 per cent of the cellulose, spreading the solution so supported and while being moved with the supporting surface into a thin layer, penetrating the solution with a coagulating medium effectively to coagulate the solution as a thin layer to convert the same into a substantially solid strip while said solution is in contact with said supporting surface until the coagulating medium finally penetrates to the supporting surface, removing the thus formed solid strip from the supporting surface, and removing the coagulating medium which has penetrated to the supporting surface from said supporting surface to prepare it for a fresh supply of copper oxide ammonia cellulose solution.

6. A continuous process of manufacturing cellulose hydrate strips comprising directly supplying to and supporting on a movable dry supporting surface a copper oxide ammonia cellulose solution, spreading the solution so supported and while being moved with the supporting surface into a thin layer, advancing the solution as a thin layer through a coagulating medium containing approximately 5 to 9.5 per cent sodium hydroxide, 0.1 to 0.5 per cent ammonia and 0.1 to 1.2 per cent copper and penetrating the solution with such coagulating medium effectively to coagulate the solution as a thin layer to convert the same into a substantially solid strip while said solution is in contact with said supporting surface until the coagulating medium finally penetrates to the supporting surface, removing the thus formed solid strip from the supporting surface, and removing the coagulating medium which has penetrated to the supporting surface from said supporting surface to prepare it for a fresh supply of copper oxide ammonia cellulose solution.

7. A continuous process of manufacturing cellulose hydrate strips consisting in directly supplying to and supporting on a movable dry supporting surface a copper oxide ammonia cellulose solution, spreading the solution so supported and while being moved with the supporting surface into a thin layer, penetrating the solution with a coagulating medium effectively to coagulate the solution as a thin layer to convert the same into a substantially solid strip while said solution is in contact with said supporting surface until the coagulating medium finally penetrates to the supporting surface, removing the thus formed solid strip from the supporting surface, and removing the coagulating medium which has penetrated to the supporting surface from said supporting surface to prepare it for a fresh supply of copper oxide ammonia cellulose solution, continuously renewing the coagulating medium to maintain the ammonia content thereof below 0.8 per cent, and finally regenerating and washing the solid strip so formed.

8. A continuous process of manufacturing cellulose hydrate strips consisting in directly supplying to and supporting on a movable dry supporting surface a copper oxide ammonia cellulose solution, spreading the solution so supported and while being moved with the supporting surface into a thin layer, penetrating the solution with a coagulating medium effectively to coagulate the solution as a thin layer to convert the same into a substantially solid strip while said solution is in contact with said supporting surface until the coagulating medium finally penetrates to the supporting surface, removing the thus formed solid strip from the supporting surface, removing the coagulating medium which has penetrated to the supporting surface from said supporting surface to prepare it for a fresh supply of copper oxide ammonia cellulose solution, successively passing the strip so formed through further treatment baths until the strip so formed consists of about 100 parts by weight of cellulose, 20 parts by weight of copper, 3 parts by weight of ammonia, and 22 parts by weight of sodium hydroxide, and finally regenerating, washing, cleaning, impregnating with softeners and drying the strip so formed.

9. A thin flexible and very strong cellulose hydrate strip capable of being crushed and crumpled and characterized by a uniform physical structure having practically equal tension and shrinkage characteristics throughout and free from internal stresses, said strip being produced by scraping the surface of a support to substantially dry the same, then supplying to the support a copper oxide ammonia solution which adheres to the support, spreading the solution on the support, and effectively coagulating said spread solution by progressively penetrating the so spread solution via the exposed surface thereof with a coagulating medium while said solution adheres closely on its unexposed side to said supporting base until the coagulating medium finally penetrates through said solution to the supporting base to form a thin layer, then removing said coagulated layer from said supporting base, and finally regenerating and washing the thin layer so formed.

10. A flexible and very strong cellulose hydrate strip capable of being crushed and crumpled and characterized by a uniform physical structure having practically equal tension and shrinkage characteristics throughout and free from internal stresses and having a weight per thousand square inches of less than 0.35 ounce, said strip being produced by scraping the surface of a support to substantially dry the same, then supplying to the support a copper oxide ammonia solution which adheres to the support, spreading the solution on the support, to a thinness corresponding to the said weight per unit area in the final strip and effectively coagulating said spread solution by penetrating the so spread solution via the exposed side thereof with an alkaline coagulating medium while the inner side of said solution is in contact with and adheres closely to the supporting base until the coagulating medium finally penetrates through said solution to the supporting base to form a thin layer, and then regenerating the thin layer so formed by passing the same through an acid bath and finally washing the same.

11. A continuous process of manufacturing cellulose hydrate strips comprising directly supplying to and supporting on a movable dry supporting base a copper oxide ammonia cellulose solution, spreading the solution so supported and while being moved with the supporting base into a thin layer of a thickness corresponding to a weight per thousand square inches of less than 0.35 ounce in the final strip, treating the solution with an alkaline coagulating medium effectively to coagulate the solution as a thin layer by progressive penetration of the coagulating medium through said solution to solidify said solution into a self-sustaining strip while its inner side is in contact with and adheres closely to said supporting base, and while said solution is moved with said supporting base through the coagulating medium for the period of penetration of the coagulating medium through the solution and finally to the supporting base, then removing the thus solidified strip from the supporting base, and removing from said supporting base any material adhering thereto so as to prepare said base for a fresh supply of a copper oxide ammonia cellulose solution.

12. A continuous process of manufacturing cellulose hydrate strips comprising directly supplying to and supporting on a movable dry supporting base a copper oxide ammonia cellulose solution, spreading the solution so supported and while being moved with the supporting base into a thin layer of a thickness corresponding to a weight per thousand square inches of less than 0.35 ounce in the final strip, treating the solution with an ammoniated alkaline coagulating medium, regulating the ammonia content of the coagulating medium during said treatment to maintain it within the range of 0.1% to 0.8% to coagulate the solution as a thin layer by progressive penetration of the coagulating medium through said solution to solidify said solution into a self-sustaining strip while its inner side is in contact with and adheres closely to said supporting base, and while said solution is moved with said supporting base through the coagulating medium for the period of penetration of the coagulating medium through the solution finally to the supporting base, then removing the thus solidified strip from the supporting base, and removing from said supporting base any material adhering thereto so as to prepare said base for a fresh supply of a copper oxide ammonia cellulose solution.

13. A continuous process of manufacturing cellulose hydrate strips comprising directly supplying to and supporting on a movable dry supporting base a copper oxide ammonia cellulose solution in which the ammonia content is approximately 45 to 85 percent of the cellulose, spreading the solution so supported and while being moved with the supporting base into a thin layer of a thickness corresponding to a weight per thousand square inches of less than 0.35 ounce in the final strip, treating the solution with an alkaline coagulating medium containing 0.1 to 0.5 percent ammonia by weight effectively to coagulate the solution as a thin layer by progressive penetration of the coagulating medium through said solution to solidify said solution into a self-sustaining strip while its inner side is in contact with and adheres closely to said supporting base, and while said solution is moved with said supporting base through the coagulating medium for the period of penetration of the coagulating medium through the solution finally to the supporting base, then removing the thus solidified strip from the supporting base, and removing from said supporting base any material adhering thereto so as to prepare said base for a fresh supply of a copper oxide ammonia cellulose solution.

14. In the continuous manufacture of thin cellulose hydrate sheets, the process comprising scraping the surface of a support to substantially dry the same, then supplying a copper oxide ammonia cellulose solution which adheres to the support, spreading the solution on the support and simultaneously metering the same to regulate the thickness and width of the solution layer adhering to the support so that when coagulated, regenerated, and dried, the resulting sheet will have a weight of not more than 0.35 ounce per thousand square inches, said solution adhering to the support with a tenacity sufficient to resist widthwise shrinkage forces incident to coagulation, then contacting the exposed side of the adhered solution with an alkali coagulant until the coagulant penetrates through the solution to the surface of the support thereby converting the solution by coagulation into a self-sustaining layer, the cohesive forces of the film layer so formed now exceeding the adhesive forces between the formed film layer and the support restraining movement of the film relatively to the support, then pulling the thus formed film from the support, and regenerating the film.

15. In the continuous manufacture of thin cellulose hydrate sheets, the process comprising scraping the surface of a support to substantially dry the same, then supplying a copper oxide ammonia cellulose solution which adheres to the support, spreading the solution on the support and simultaneously metering the same to regulate the thickness and width of the solution layer adhering to the support so that when coagulated, regenerated, and dried, the resulting sheet will have a weight of not more than 0.35 ounce per thousand square inches, said solution adhering to the support with a tenacity sufficient to resist widthwise shrinkage forces incident to coagulation, then contacting the exposed side of the adhered solution with an ammoniated alkali coagulant until the coagulant penetrates through the solution to the surface of the support thereby converting the solution by coagulation into a self-sustaining layer, the ammonia content of said coagulant being in the proportion of not more than 35.55 percent of the ammonia content of the solution being coagulated, the cohesive forces of the film layer so formed now exceeding the adhesive forces between the formed film layer and the support restraining movement of the film relatively to the support, then pulling the thus formed film from the support, and regenerating the film.

EMIL CZAPEK.